Patented Mar. 31, 1942

2,277,819

UNITED STATES PATENT OFFICE 2,277,819

CATALYTIC HYDROCARBON REACTIONS AND CATALYSTS THEREFOR

Willis G. Craig, Redlands, Calif., assignor to James W. Jean, Altadena, Calif.

No Drawing. Application August 2, 1940,
Serial No. 350,141

7 Claims. (Cl. 196—10)

My invention relates to the catalytic reactions of organic compounds for accelerating the production of lighter petroleum fractions. It is well recognized that the energy which is available in the normally gaseous hydrocarbons of heavy petroleum fractions is exceedingly great. Many attempts have been made to transform these low molecular weight hydrocarbons into compounds having more desirable characteristics. For instance, the possibility of polymerizing the normally gaseous olefin hydrocarbons to liquid boiling within the range of motor fuel has long been recognized and processes for the alkylation of isoparaffins by means of normally gaseous olefins have attracted considerable attention. This reaction is directly applicable to the $C_4$ or butane hydrocarbon fraction and has the decided advantage over the polymerization reaction of making available by a single step a marked increase in quantity of polymer. Alkylation reaction usually has decided advantages over polymerization. There are however situations in which the use of both are more effective for utilizing the raw materials which are available. Since any given hydrocarbon fraction such, for instance, as the butane-butene cut derived from either natural gas or cracking still gases the amount of normal paraffin is usually at least twice the amount of isoparaffin, it is generally desirable to isomerize as much of the former as possible in order to provide adequate isoparaffin for the alkylation reaction.

Another hydrocarbon reaction desirable is the reaction of a hydrocarbon molecule boiling above the motor fuel range with one boiling below the range whereby two molecules boiling within the range are produced. The catalytic hydration of the normally gaseous olefins, and particularly ethylene and propylene, to the corresponding alcohols is important and the direct catalytic esterification of the lower fatty acids, such as formic, acetic and propionic acids by reaction with the appropriate olefins such as ethylene, propylene or the butenes is also of considerable economic significance.

All of the foregoing organic reactions and many others have been catalyzed to a greater or less degree and it is well established that a catalyst to be superior to those heretofore employed must, among other features eliminate corrosive hazards and be low in cost. It is therefore an object of the present invention to provide an inexpensive dry solid catalyst having superior catalytic activity without detrimental effect upon metal. It is another object of this invention to provide an improved method of converting normally gaseous hydrocarbons, and particularly those of three and four carbon atoms per molecule, into liquid motor fuels by means of a catalyst having increased catalytic power superior to those heretofore employed. Another object of my invention is to provide a catalyst useful in polymerizing, copolymerizing, condensation, alkylation, isomerization, disproportionation, hydration, dehydration, esterification, and similar reactions, and which is in solid form, or in the form of gel, non-corrosive to metal equipment, and safe to handle. A still further object is the production of a catalyst which can be used as a gel or reduced to solid fine particles. Other important objects of my invention will be apparent from the following description and appended claims.

In the preparation of a catalyst for any given reaction a considerable number of factors must be taken into account in addition to catalytic activity for the particular reaction or reactions desired, such as, for instance, the ruggedness of the catalyst material, the cost of ingredients, the tendency to produce undesired side reactions, the duration of catalytic activity or catalytic life, the readiness with which catalytic activity once lost may be restored, the ready adaptability of the catalyst for particular purposes, etc. I have found that in the production of a catalyst having substantially the qualities capable of favorably complying with the above factors the results attained can be controlled and predetermined by combining in the proper proportions and in the proper manner several ingredients of different types, each ingredient being selected to contribute some specific quality to the finished catalyst. For instance, I have found that by combining boric acid, sulphuric acid and phosphoric acid together in the proper proportions and in the proper manner a catalyst gel is produced which possesses exceedingly active catalytic properties and which is easily applied in use. I have found further that by adding a cementing agent such as a metal sulphate or a metal phosphate and a supporting medium to the mixture that a hard solid form of catalyst can be produced which is highly effective as a catalyst for the various uses above indicated.

One form of the present invention resides in the production of a catalyst composed of boric acid, sulphuric acid and phosphoric acid, coalesced into an acid gel. This gel is producible by a simple series of steps, comprising generally mixing commercial boric acid in powdered form with commercial sulphuric acid. This mixture is first heated to about 160 to 200 degrees F., until the boric acid is dissolved. Then commercial phosphoric acid is added to the mixture, the phosphoric acid being at normal room temperature while the mixture of boric acid and sulphuric acid remains in hot condition as the result of previous mixing. The combination of these three acids in the foregoing manner causes the formation of a heavy grease-like gel. This acid gel can be used as a catalyst by stirring the same into the hydrocarbon liquid, such as cracked gasoline, and filtering out the gum forming constituents. The proportions of the constituents composing the gel catalyst may be for example 500 grams of commercial boric acid; 1980 grams of commercial sulphuric acid (66 Baumé), and 2160 grams of commercial phosphoric acid. The resulting concentration of acid is so buffered that its action is mild and prolonged with no charring effect and the catalyst is efficient and highly effective.

This acid gel concentration can be used in liquid phase directly as a catalyst, or by further treatment it can be reduced to solid form and fractured into fine particles which serve as an effective catalyst for use for treating hydrocarbons in vapor phase, all for the purposes defined above. As an example of further treatment, I add aluminum sulphate as a cementing agent, dissolved in water and then mix with infusorial earth as a solid carrier to form a stiff paste. This paste is later dehydrated, leaving a hard, porous dry body which is then reduced by fracture into fine, hard acid bearing particles. These particles are then sized by passing through a suitable screen of 8 to 14 or other suitable mesh. The proportion of aluminum sulphate may be 1000 grams to which approximately 100 c. cs. of water is added. This mixture is heated slowly to dissolve the sulphate. When dissolved the solution is added while hot to the previously prepared gel, into which it is stirred until thoroughly mixed. To dehydrate the mixture it is placed in an oven and heated to approximately 300 degrees F. or other suitable temperature until substantially all moisture is evaporated. As the phosphoric acid is added to the mixture of boric acid and sulphuric acid the mass is quickly consolidated by coalescence and chemical reaction into a gel and as the aluminum sulphate and infusorial earth are added the mass is formed into a stiff paste which when dehydrated is consolidated by coalescence and chemical reaction into a hard, porous substance of highly acid reaction which is easily segregated by fracture into a mass of hard, solid, dry, granular and porous particles. In place of infusorial earth magnesium silicate or any other suitable hard porous supporting medium can be used.

The following example of an actual run typifies the use of my improved catalyst for polymerizing refinery and olefinic gases although a number of others are available. The catalyst in segregated condition and screened to about 8 to 14 mesh was used in an upright treating tube 1¾ inches in diameter by 27 inches long, maintained at a temperature of about 200 to 400 degrees F., the optimum temperature being approximately 275 to 300 degrees F. A mixture of saturated and unsaturated gases from an oil cracking plant was passed downwardly through the catalyst while under 200 to 500 pounds to the sq. in. pressure. This gas analyzed roughly as follows:

| | Percent |
|---|---|
| Olefins (largely butenes) | 45 |
| 1 and 2 butene | 30% |
| Isobutene | 15% |
| Paraffins (largely butane) | 55 |
| Butane | 37% |
| Isobutane | 18% |

A polymer liquid having the following characteristics was produced:

| | |
|---|---|
| Gravity | 66.5 |
| Initial boiling point_____degrees F_ _ | 100 |
| 50% _____do____ | 220 |
| 90% _____do____ | 280 |
| End boiling point_____do____ | 410 |
| Distillation loss_____percent__ | 2 |
| Octane number | 96 |

I claim as my invention:

1. A process for the treatment of normally gaseous hydrocarbons containing olefins to convert the same into liquid hydrocarbons suitable for motor fuel, which comprises subjecting the said gaseous hydrocarbons containing olefins to the action of a solid catalyst, composed of sulphuric acid and phosphoric acid, buffered by boric acid and cemented by a metal sulphate.

2. A process for the treatment of normally gaseous hydrocarbons containing olefins to convert the same into liquid hydrocarbons suitable for motor fuel, which comprises subjecting the said gaseous hydrocarbons containing olefins to the action of a solid catalyst comprising sulphuric acid and phosphoric acid, buffered by boric acid and cemented by a metal phosphate.

3. A process for the polymerization of normally gaseous hydrocarbons to convert the same into liquid hydrocarbons suitable for motor fuel, which comprises subjecting the said gaseous hydrocarbons to the action of a solid catalyst containing phosphoric and sulphuric acids buffered by boric acid and extended by a solid carrier, the whole being cemented by aluminum sulphate.

4. A process for the polymerization of normally gaseous hydrocarbons to convert the same into liquid hydrocarbons suitable for motor fuel, which comprises subjecting the said gaseous hydrocarbons to the action of a solid catalyst containing phosphoric and sulphuric acids buffered by boric acid and extended by a solid carrier, the whole being cemented by aluminum phosphate.

5. A process for the polymerization of normally gaseous hydrocarbons to convert the same into liquid hydrocarbons suitable for motor fuel, which comprises subjecting the said gaseous hydrocarbons to the action of a solid catalyst containing sulphuric acid and phosphoric acid, buffered by boric acid and extended by a solid carrier and cemented by aluminum sulphate, the hydrocarbon reaction being carried out at a temperature of about 200 to 400 degrees F. and greater than atmospheric pressure.

6. A catalyst useful in the treatment of normally gaseous hydrocarbons containing olefins, comprising, sulphuric acid and phosphoric acid buffered by boric acid and extended by a solid carrier, the whole being cemented by aluminum sulphate and reduced by fracture into a mass of catalytic particles.

7. A catalyst useful in the treatment of normally gaseous hydrocarbons containing olefins, comprising, sulphuric acid and phosphoric acid buffered by boric acid and extended by a solid carrier, the whole being cemented by aluminum phosphate and reduced by fracture into a mass of catalytic particles.

WILLIS G. CRAIG.